US009444240B2

(12) United States Patent
Argyle et al.

(10) Patent No.: US 9,444,240 B2
(45) Date of Patent: Sep. 13, 2016

(54) AERIAL CABLE SPACER APPARATUS WITH ROLLERS AND ASSOCIATED METHODS THEREOF

(71) Applicant: Marmon Utility, LLC, Milford, NH (US)

(72) Inventors: Jared Argyle, Amherst, NH (US); Brian Boisclair, Goffstown, NH (US); Leonard Jean, Melbourne, FL (US); Edward Laughlin, Lowell, MA (US); Javier Philbrick, Nashua, NH (US)

(73) Assignee: Marmon Utility, LLC, Milford, NH (US)

(*) Notice: Subject to any disclaimer, the term of this patent is extended or adjusted under 35 U.S.C. 154(b) by 471 days.

(21) Appl. No.: 14/060,928

(22) Filed: Oct. 23, 2013

(65) Prior Publication Data

US 2014/0138145 A1 May 22, 2014

Related U.S. Application Data

(60) Provisional application No. 61/728,444, filed on Nov. 20, 2012.

(51) Int. Cl.
*H02G 7/12* (2006.01)
*H02G 1/04* (2006.01)

(52) U.S. Cl.
CPC . *H02G 7/12* (2013.01); *H02G 1/04* (2013.01)

(58) Field of Classification Search
CPC .......... H02G 7/12; H02G 7/125; H02G 7/02; H02G 7/04; H02G 7/00; H02G 1/00; H02G 1/02; H02G 1/04; B66D 3/04

USPC ....... 174/40 R, 146, 40 CC, 41, 43, 44, 144; 248/61, 74.1, 74.2; 254/134.3 R; 403/104, 107

See application file for complete search history.

(56) References Cited

U.S. PATENT DOCUMENTS

| | | | |
|---|---|---|---|
| 3,076,865 A | 2/1963 | Volk et al. | |
| 3,300,576 A | 1/1967 | Hendrix et al. | |
| 3,456,066 A * | 7/1969 | Petze, Jr. ................. | H02G 7/12 174/146 |
| 3,748,370 A | 7/1973 | Dalia | |
| 4,020,277 A | 4/1977 | La Chance, Sr. et al. | |
| 4,082,917 A | 4/1978 | Hendrix | |
| 4,188,502 A | 2/1980 | Gagne | |
| 5,021,612 A | 6/1991 | Joffe | |
| 5,700,980 A | 12/1997 | Bello et al. | |
| 6,170,783 B1 | 1/2001 | Bello | |
| 6,303,856 B1 | 10/2001 | Bello | |
| 7,323,636 B1 | 1/2008 | Borges et al. | |
| 8,079,122 B2 | 12/2011 | Kwon et al. | |
| 9,022,357 B2 * | 5/2015 | Argyle ..................... | H02G 7/12 254/134.3 R |
| 2007/0284143 A1 | 12/2007 | Borges et al. | |
| 2010/0012351 A1 | 1/2010 | Boisclair | |

FOREIGN PATENT DOCUMENTS

JP       2005295660 A    10/2005

* cited by examiner

*Primary Examiner* — Angel R Estrada
(74) *Attorney, Agent, or Firm* — Hayes Soloway, P.C.

(57) ABSTRACT

An aerial cable spacer apparatus and associated methods thereto are provided. The aerial cable spacer apparatus includes a spacer arm. A spacer body is connected to the spacer arm. At least one saddle is formed on the spacer body. At least one roller is connected to at least one of the at least one saddle and the spacer body, wherein an exterior surface of the at least one roller is positioned to intersect a cable interface path of the at least one saddle.

20 Claims, 8 Drawing Sheets

AERIAL CABLE SPACER APPARATUS WITH ROLLERS AND ASSOCIATED METHODS THEREOF

CROSS REFERENCE TO RELATED APPLICATION

This application claims benefit of U.S. Provisional Application Ser. No. 61/728,444 entitled, "Aerial Cable Spacer Apparatus with Rollers and Associated Methods Thereof" filed Nov. 20, 2012, the entire disclosure of which is incorporated herein by reference.

FIELD OF THE DISCLOSURE

The present disclosure is generally related to overhead transmission and distribution systems and more particularly is related to an aerial cable spacer apparatus and associated methods thereof used in overhead transmission and distribution systems.

BACKGROUND OF THE DISCLOSURE

Cables used in overhead transmission and distribution systems conventionally require a variety of devices for their installation and permanent retention on aerial fixtures. Often times, certain devices are used for installing the cables and then replaced with permanent fixtures which retain the cables for indefinite periods of time. The use of these many installation and permanent retention components comes at a high cost to utility companies. These costs, coupled with the expense in man hours for installation of the cables adds significant costs to the operational budgets of the utility companies, which is passed along to the consumer in the form of higher utility bills.

One of the devices conventionally used to retain cables in aerial positions is a cable spacer. FIG. 1 is a front view illustration of a cable spacer 10, in accordance with the prior art. The cable spacer 10 includes a body member 12, a hanging arm 14, and a messenger-wire engagement area 16 for receiving a messenger wire 18, also referred to as a messenger cable. The body member 12 has a plurality of cable seats 20 for holding a plurality of cables 22. Retaining means 24 are pivotal on the cable spacer 10 to secure the cables 22 within the cable seats 20. The retaining means 24 may use a ratchet system for securing the cable 22 within the cable seats 20. In FIG. 1, the left retaining means 24 is shown in the fully closed position around the cable 22, the lowermost retaining means 24 is shown in the partially open position, and the right retaining means 24 is shown in the fully open position, with the retaining means 24 disconnected from the body member 12.

In use, the cable spacer 10 is hung on the messenger wire 18 and cables 22 are placed in the cable seats 20 to suspend them in a position below the messenger wire 18. Due to the elongate nature of the cable 22 and the resulting weight of the cable, the spacers 10 must be positioned at predetermined intervals along the cable path. When the cable is being installed, e.g., when it is pulled through the cable seats 20 to the desired position, the cable 22 may need to be supported by the spacer 10 yet be movable through the spacer 10. Moving the cable 22 through the cable seats 20 often results in complications, due to the weight of the cable 22 that creates a substantial amount of friction on the spacer 10 and dislodges the spacer 10 from its position on the messenger wire 18.

Thus, a heretofore unaddressed need exists in the industry to address the aforementioned deficiencies and inadequacies.

SUMMARY OF THE DISCLOSURE

Embodiments of the present disclosure provide an apparatus and method for an aerial cable spacer. Briefly described, in architecture, one embodiment of the system, among others, can be implemented as follows. The aerial cable spacer apparatus includes a spacer arm. A spacer body is connected to the spacer arm. At least one saddle is formed on the spacer body. At least one roller is connected to at least one of the at least one saddle and the spacer body, wherein an exterior surface of the at least one roller is positioned to intersect a cable interface path of the at least one saddle.

The present disclosure can also be viewed as providing an aerial cable spacer apparatus. Briefly described, in architecture, one embodiment of the apparatus, among others, can be implemented as follows. A spacer arm extends from a spacer body. A plurality of saddles are formed on the spacer body and extends from the spacer body. At least one roller is positioned within each of the plurality of saddles, wherein the at least one roller is rotatable on an axle secured to each of the plurality of saddles, wherein an exterior surface of the at least one roller substantially aligns with a cable contact surface of each of the plurality of saddles.

The present disclosure can also be viewed as providing a method of stringing and retaining a cable using an aerial cable spacer apparatus. In this regard, one embodiment of such a method, among others, can be broadly summarized by the following steps: affixing a spacer body having a spacer arm to a messenger wire; positioning a cable within at least one saddle formed on the spacer body; and contacting at least one roller with at least a portion of the cable, wherein the at least one roller is connected to at least one of the at least one saddle and the spacer body, wherein an exterior surface of the at least one roller intersects a cable interface path of the at least one saddle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
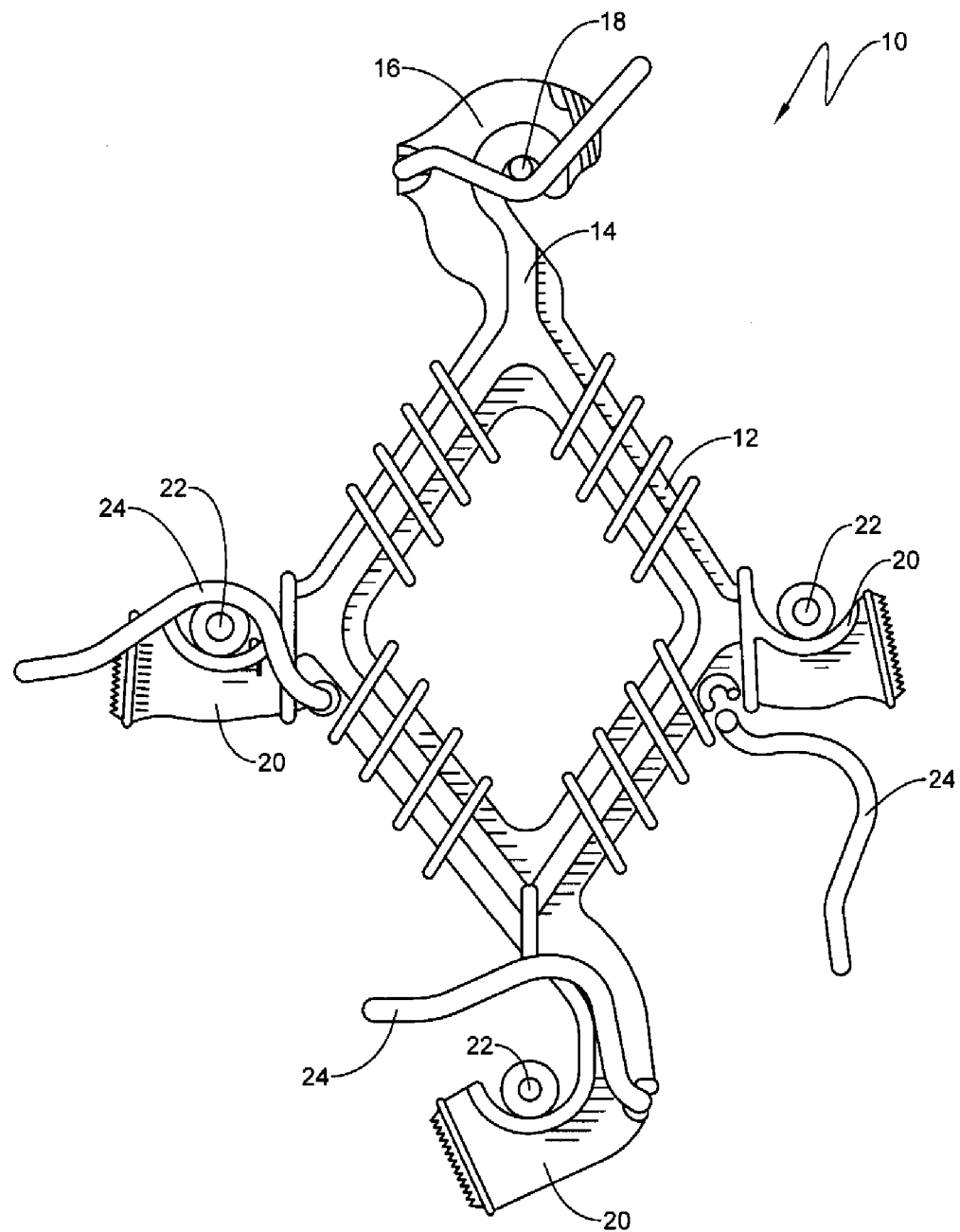
FIG. 1 is a front view illustration of a cable spacer, in accordance with the prior art.
Figure 2:
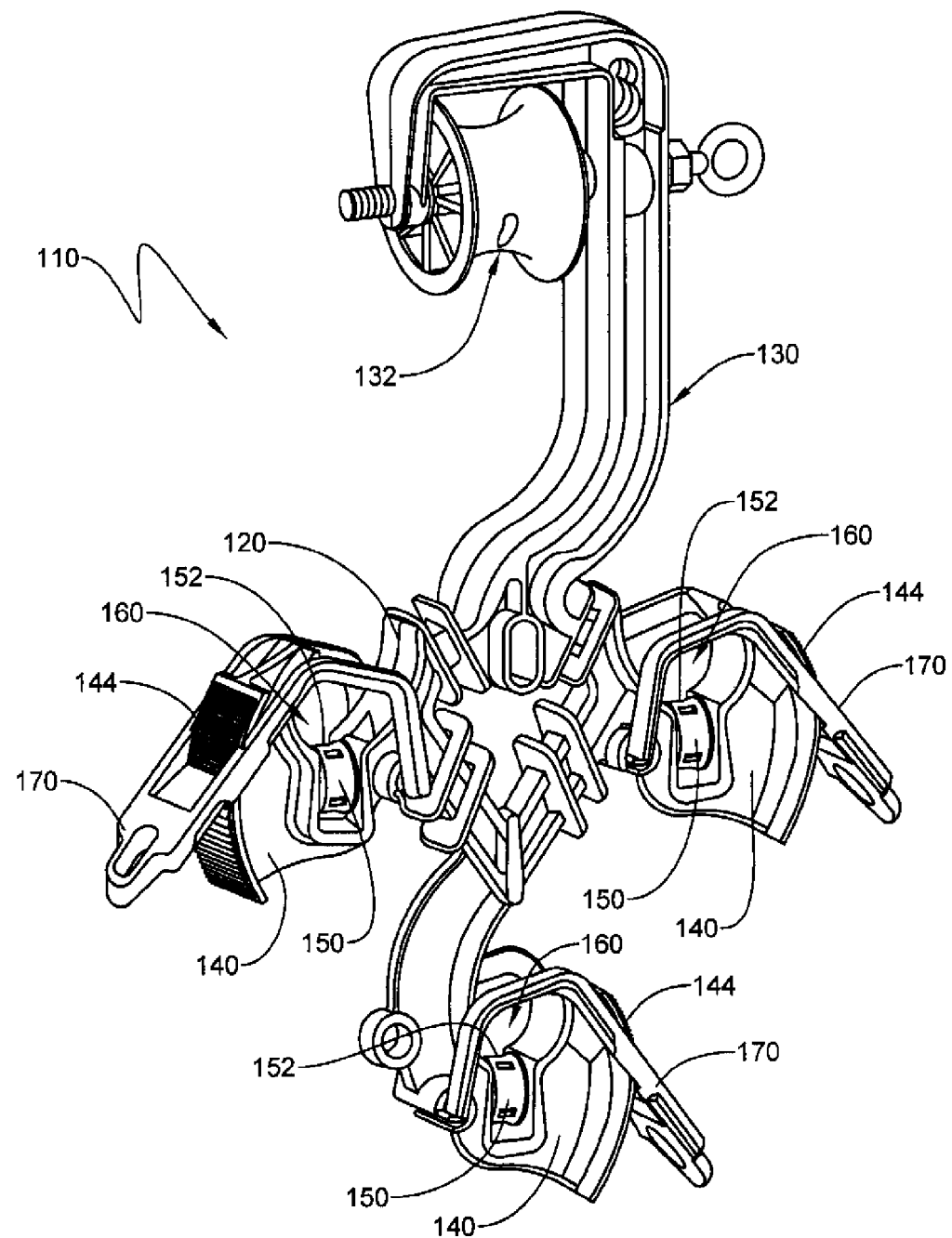
FIG. 2 is a plan view illustration of an aerial cable spacer apparatus, in accordance with a first exemplary embodiment of the present disclosure.

FIG. 2 is a plan view illustration of an aerial cable spacer apparatus 110, in accordance with a first exemplary embodiment of the present disclosure. The aerial cable spacer apparatus 110, which may be referred to herein simply as 'spacer 110' includes a spacer arm 130. A spacer body 120 is connected to the spacer arm 130. At least one saddle 140 is formed on the spacer body 120. At least one roller 150 is connected to at least one of the saddle 140 and the spacer body 120, wherein an exterior surface 152 of the roller 150 is positioned to intersect a cable interface path 160 of the at least one saddle 140.

The spacer 110 may be used with stringing and retaining a cable, such as cable commonly used with utility transmission, distribution, or conduction. The spacer 110 may be supported in a hanging position from a durable wire structure that is used to support cable, known within the industry as a messenger wire, a messenger cable, or a catenary. A retaining structure 132, such as a hook or a wheel, may be positioned on an end of the spacer arm 130 to interface with the messenger wire. A variety of devices known within the industry may be used to facilitate connection or release of the spacer 110 from the messenger wire, all of which are considered within the scope of this disclosure. When the spacer 110 is oriented in a hanging position from the messenger wire, the saddles 140 may be positioned to retain a quantity of cable below the messenger wire. A plurality of spacers 110 may be used in conjunction, thereby allowing for an elongate run of cable to be suspended from a length of messenger wire.

The spacer body 120 of the spacer 110 may have any size or configuration. As is shown in FIG. 2, the spacer body 120 may be a substantially triangular or diamond shape that is connected to the spacer arm 130 along one edge and supports a plurality of saddles 140 on other edges. The saddles 140 may be supported by the spacer body 120, such as by being affixed to the spacer body 120, or by being integrally attached to the spacer body 120. The saddles 140 each include an interior area that forms a cable interface path 160, characterized as the portion of the saddle 140 that receives a segment or portion of a cable that is being retained by the spacer 110. For example, in FIG. 2, the cable interface path 160 is the portion of the saddle 140 that is formed by the arced interior or seat of the saddle 140—partially formed by the roller 150—which would retain or support a cable that is located within the saddle 140.

The saddle 140 includes at least one roller 150 that assists the cable with moving through the saddle 140. The roller 150 is a rotatable device that is positioned or located proximate to the saddle 140, often connected directly to the saddle 140, as is shown in FIG. 2. Other embodiments within this disclosure may include rollers 150 that are positioned proximate to the saddle 140 in other ways. The roller 150 is positioned such that its exterior surface 152 intersects the cable interface path 160 of the saddle 140, thereby allowing the exterior surface 152 to contact the cable when the cable is positioned within the saddle 140. The roller 150 may form part of the contact surface or seat within the saddle 140. The roller 150 may have a variety of different configurations for use, including rollers 150 that are permanently positioned proximate to the saddle 140, as is shown in FIG. 2, and/or rollers 150 that are removable from the intersecting position with the cable interface path 160, discussed relative to FIGS. 6-7. The rollers 150 used with the spacer 110 may have more than one direction of rotation; however the rollers 150 will have at least the ability to rotate about an axis that is substantially perpendicular to an elongate length of the cable.

In use, a cable may be placed within the cable interface path 160 of a saddle 140. The cable may be supported within the saddle 140 by the roller 150 and with the arced edges formed on the saddle 140, such that the cable is unable to move laterally out of the saddle 140. When it is desired for the cable to be moved through the saddle 140 in a direction along the length of the cable, i.e., parallel with an elongate axis of the cable, the roller 150 may rotate as the cable is pulled over it. Rotation of the roller 150 may allow for a low friction movement of the cable relative to the saddle 140, since the roller 150 is receiving the bulk of the weight of the cable as it passes through the saddle 140. This use of the rollers 150 may provide an efficient method for moving the cable through the saddle 140 without dislodging the spacer 110 from the messenger wire or moving the spacer 110 along the messenger wire.

After the cable has reached a desired position within the saddle 140, a ratchet arm 170 may be closable on the saddle 140 to secure a cable within the saddle 140. The ratchet arm 170 may be retained in place by engagement of a pawl on the ratchet arm 170 with a plurality of ratchet teeth 144 positioned on an exterior of the saddle 140. In this engaged position, the ratchet arm 170 is capable of preventing the cable from be dislodged out of the saddle 140 in any radial direction. Depending on how tightly the ratchet arm 170 is closed on the saddle 140 may control whether the cable is linearly movable through the saddle 140. For example, when the ratchet arm 170 is lightly engaged with the ratchet teeth 144, such that the cable is not frictionally contacted between the saddle 140 and the ratchet arm 170, the cable may be moveable through the saddle 140 but not capable of being dislodged in a radial direction therefrom. This configuration of the ratchet arm 170 may be useful when the cable is strung or pulled through the saddles 140. When the ratchet arm 170 is tightened on the saddle 140, the cable may be frictionally compressed therebetween, which may prevent all movement of the portion of the cable within the saddle 140 relative to the spacer 110.

Figure 3:
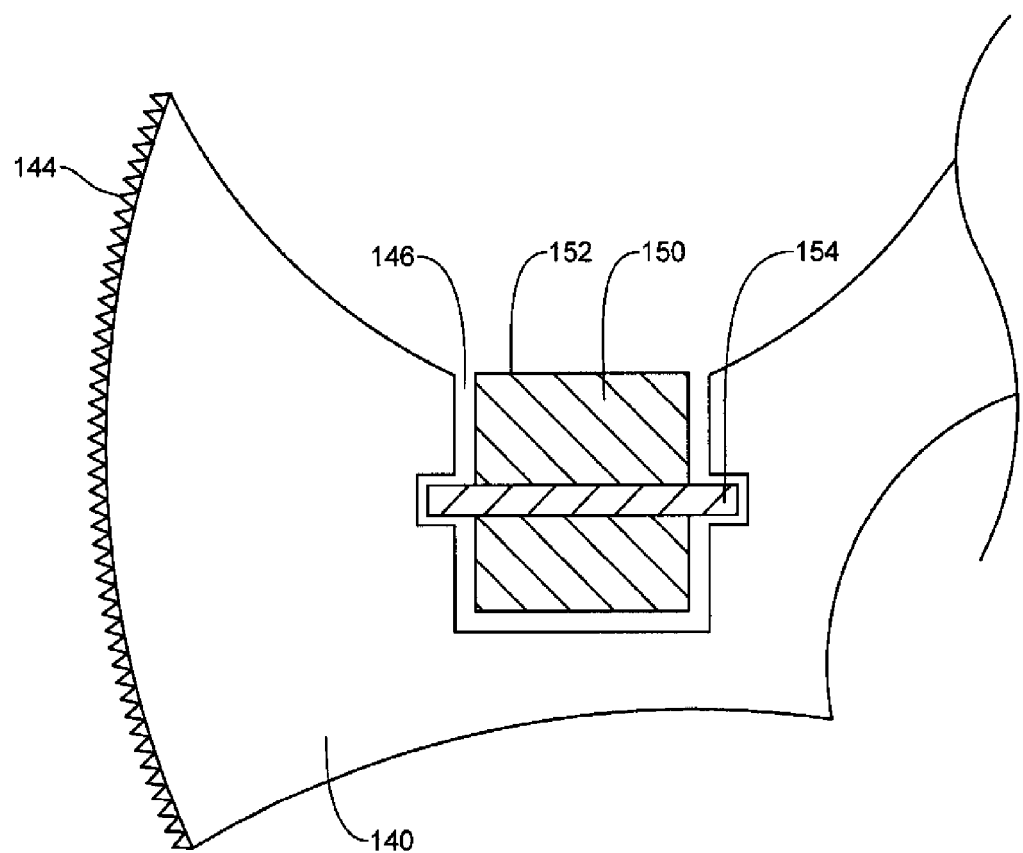
FIG. 3 is a cross-sectional view illustration of a saddle of an aerial cable spacer apparatus of FIG. 2, in accordance with the first exemplary embodiment of the present disclosure.

FIG. 3 is a cross-sectional view illustration of a saddle 140 of an aerial cable spacer apparatus 110 of FIG. 2, in accordance with the first exemplary embodiment of the present disclosure. The saddle 140 includes a pocket 146 that houses the roller 150 with enough clearance so the roller 150 can rotate within the pocket 146. An axle 154 is positioned within the pocket 146 which the roller 150 rotates upon. The positioning of the axle 154 may allow for the exterior surface 152 of the roller 150 to be aligned with the saddle seat 152 of the saddle 150, or depending on the configuration, to be positioned above or below the saddle seat 152.

Figure 4:
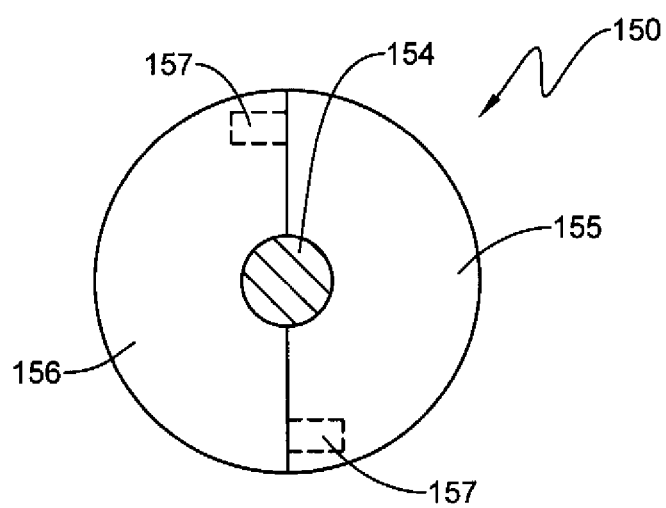
FIG. 4 is a side view illustration of the roller of an aerial cable spacer apparatus of FIG. 2, in accordance with the first exemplary embodiment of the present disclosure.

FIG. 4 is a side view illustration of the roller 150 of an aerial cable spacer apparatus 110 of FIG. 2, in accordance with the first exemplary embodiment of the present disclosure. The roller 150 may be formed as a separable roller having at least two roller segments. FIG. 4 depicts the roller 150 as having a first roller segment 155 and a second roller segment 156, but any number of roller segments may be included. The first and second roller segments 155, 156 are connectable together about the axle 154 to form the roller 150. The connection between the first and second roller segments 155, 156 may be facilitated by a connection system 157, discussed relative to FIG. 5. The tolerance of the roller 150 on the axle 154 may be selected to allow for any desired level of rotation of the roller 150 on the axle 154, which may include the use of lubricants or other substances to enhance rotation of the roller 150.

Figure 5:
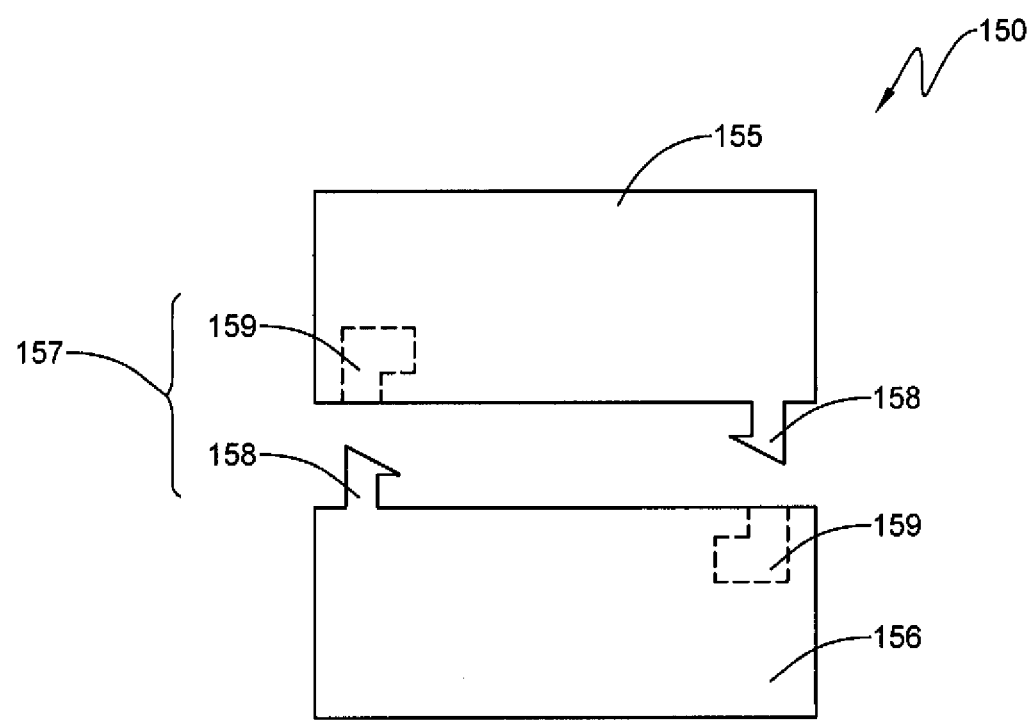
FIG. 5 is an exploded top view illustration of the roller of an aerial cable spacer apparatus of FIG. 2, in accordance with the first exemplary embodiment of the present disclosure.

FIG. 5 is an exploded top view illustration of the roller 150 of an aerial cable spacer 110 apparatus of FIG. 2, in accordance with the first exemplary embodiment of the present disclosure. The connection system 157 within the roller 150 can be seen within FIG. 5, where a connector 158 extends from each of the roller segments and a receiving structure 159 is positioned within each of the roller segments. When the first roller segment 155 is connected with the second roller segment 156, the connector 158 on each of the roller segments enters the receiving structure 159 on the opposing roller structure. Once engaged, the roller segments may be removably retained together with the connection system 157. Each of the roller segments may be manufactured or formed identical to one another, thereby allowing for easy interchangeability of the roller segments in forming the roller 150.

Figure 6:
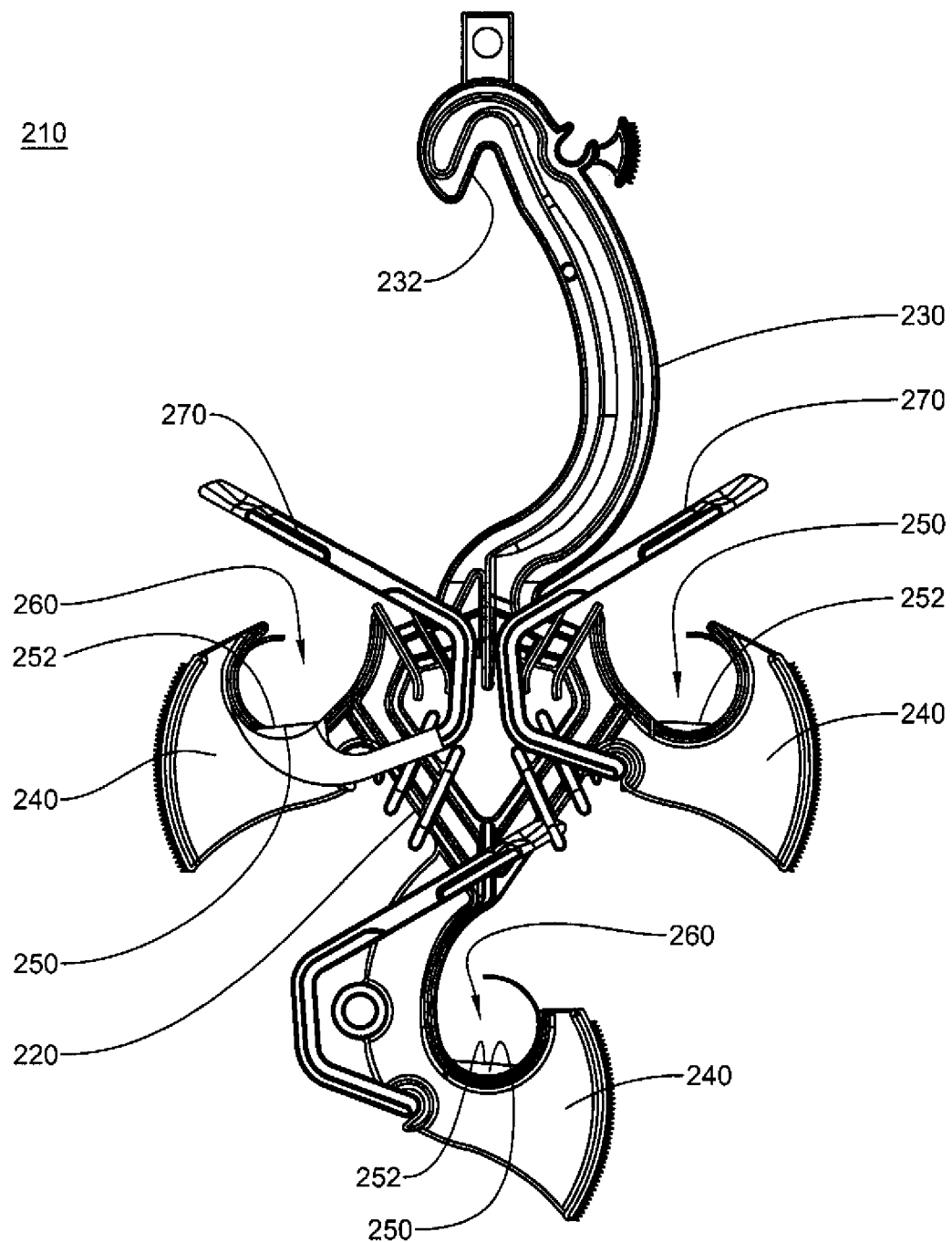
FIG. 6 is a side view illustration of an aerial cable spacer apparatus, in accordance with a second exemplary embodiment of the present disclosure.

FIG. 6 is a side view illustration of an aerial cable spacer apparatus 210, in accordance with a second exemplary embodiment of the present disclosure. The aerial cable spacer apparatus 210, which may be referred to herein simply as 'spacer 210', may include any of the features, functions, or structures disclosed in any other embodiment of this disclosure. The spacer 210 includes a spacer arm 230. A spacer body 220 is connected to the spacer arm 230. At least one saddle 240 is formed on the spacer body 220. At least one roller 250 is connected to at least one of the saddle 240 and the spacer body 220, wherein an exterior surface 252 of the roller 250 is positioned to intersect a cable interface path 260 of the at least one saddle 240.

A retaining structure 232, such as a hook or a wheel, may be positioned on an end of the spacer arm 230 to interface with the messenger wire. A variety of devices known within the industry may be used to facilitate connection or release of the spacer 210 from the messenger wire, all of which are considered within the scope of this disclosure. When the spacer 210 is oriented in a hanging position from the messenger wire, the saddles 240 may be positioned to retain a quantity of cable below the messenger wire. A plurality of spacers 210 may be used in conjunction, thereby allowing for an elongate run of cable to be suspended from a length of messenger wire.

Similar to FIGS. 2-5, the saddle 240 includes at least one roller 250 that assists with allowing a cable to move through the saddle 240. The roller 250 is a rotatable device that is positioned or located proximate to the saddle 240. However, unlike FIGS. 2-5, the roller 250 of FIG. 6 may be movable to and from a position to intersect a cable interface path 260 of the saddle 240. When the roller 250 is intersecting the cable interface path 260, the exterior surface of the roller 250 will be in a position to contact the cable. The roller 250 is removable from the intersecting position with the cable interface path 260 by movement of an arm 270, which is pivotal on a pivot point located on at least one of the spacer body 220 and the saddle 240.

Figure 7:
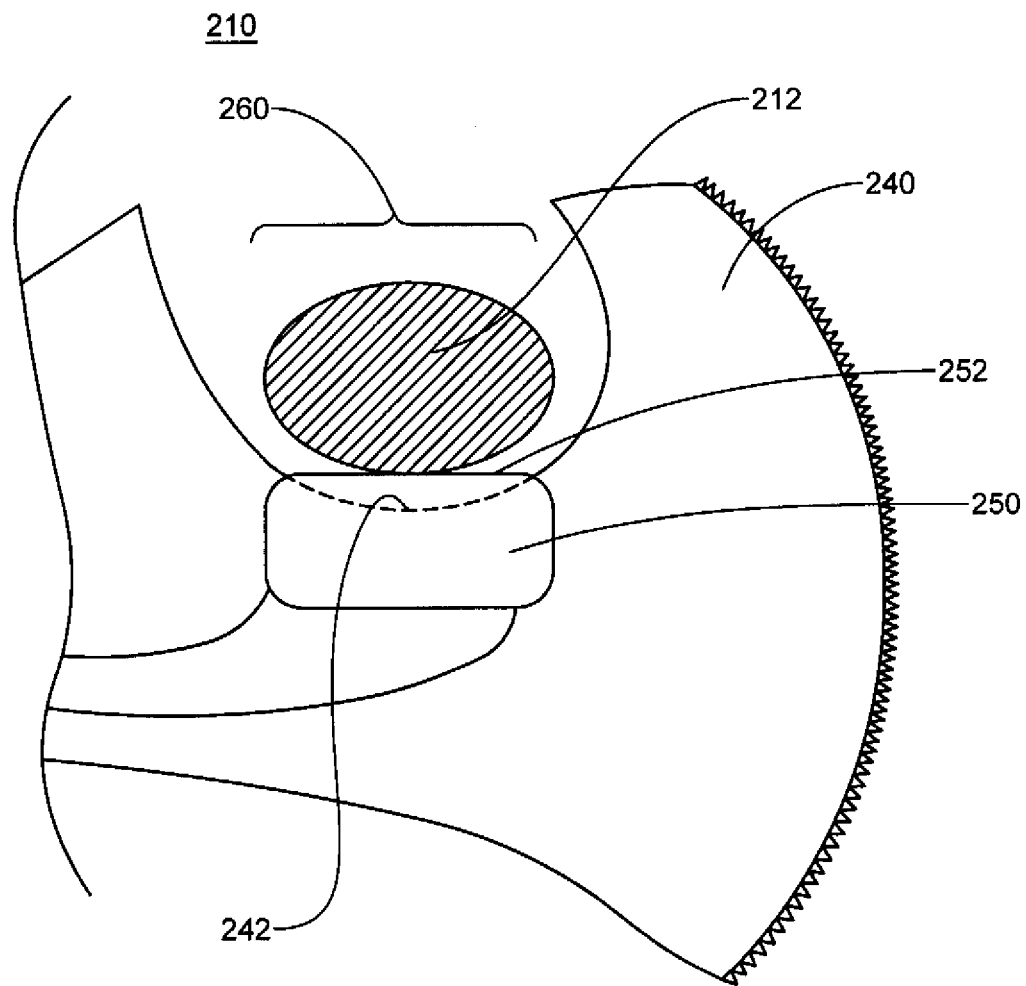
FIG. 7 is a side view illustration of the aerial cable spacer apparatus of FIG. 6, in accordance with the second exemplary embodiment of the present disclosure.

In use, a cable may be placed within the cable interface path 260 of a saddle 240 (shown in detail in FIG. 7). The cable may be supported within the saddle 240 with the arced edges formed on the saddle 240, such that the cable is unable to move laterally out of the saddle 240. When it is desired for the cable to be moved through the saddle 240 in a direction along the length of the cable, i.e., parallel with an elongate axis of the cable, the roller 250 may be moved to intersect the cable interface path 260. In other words, the roller 250 may be positioned such that the roller 250 contacts the underside of the cable to at least partially lift the cable off of the bottom of the saddle 240. The cable may then be moved through the saddle 240 with the roller 250 receiving the weight of the cable as it passes through the saddle 240. This ability of the roller 250 to contact the cable may allow for lower friction as the cable passes through the saddle 240, thereby providing an efficient method for moving the cable through the saddle 240.

After the cable has reached a desired position within the saddle 240, the roller 250 may be moved away from an intersecting position with the cable interface path 260 to let the cable contact the bottom of the saddle 240. The arm 270 may include a ratchet device integral therein, which may be engaged with an exterior surface of the saddle 240 to retain the cable within the saddle 240. For example, the arm 270 may be used to retain the cable within the saddle 240 after the cable has been moved to an installed position within the saddle. Thus, the spacer 210 may be an efficient tool for both installation of the cable and as a permanent fixture for retaining the cable in an aerial position.

FIG. 7 is a side view illustration of the aerial cable spacer apparatus 210 of FIG. 6, in accordance with the second exemplary embodiment of the present disclosure. As is shown in FIG. 7, the saddle 240 of the spacer 210 is shown in detail. A cable 212 is positioned within the saddle 240 and in contact with an exterior surface 252 or contact surface of the roller 250. The roller 250 is positioned intersecting the cable interface path 260, in that the exterior surface 252 of the roller 250 is not aligned with the seat 242 or bottom surface of the saddle 240 and is positioned to receive substantial contact by the cable 212. In this orientation, the cable 212 is positioned in contact with the roller 250, thereby allowing the cable 212 to be moved through the saddle 240 by roller on the contact surface 252 of the roller 250. The roller 250 depicted in FIG. 7 is a movable roller that may be moved away from an intersecting position with the cable interface path 260. When this movement occurs, the cable 212 may be lowered to contact the seat 242 of the saddle 240.

Figure 8:
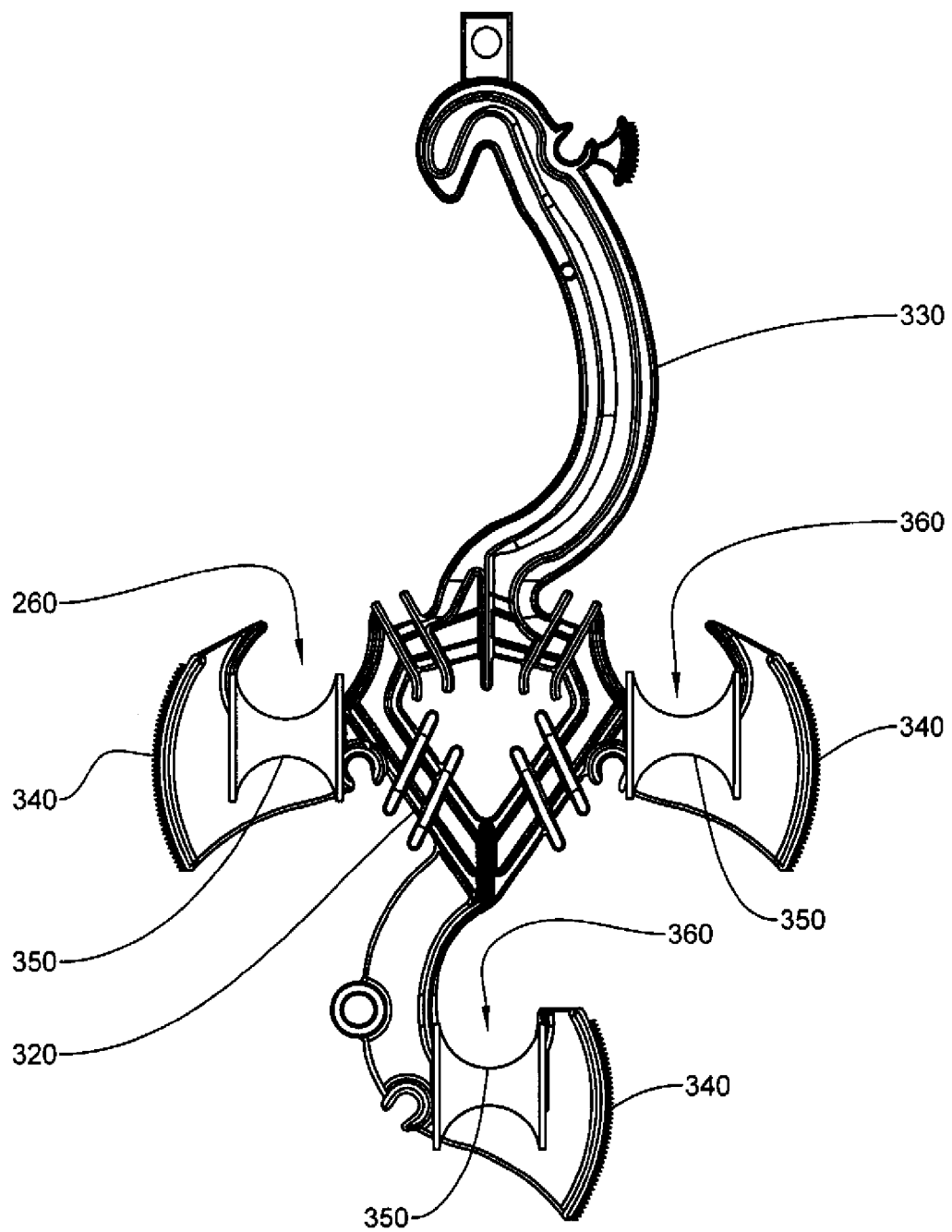
FIG. 8 is a side view illustration of the aerial cable spacer apparatus, in accordance with a third exemplary embodiment of the present disclosure.

FIG. 8 is a side view illustration of the aerial cable spacer apparatus 310, in accordance with a third exemplary embodiment of the present disclosure. The aerial cable spacer apparatus 310 of the second exemplary invention, which may be referred to herein simply as 'spacer 310,' may include any of the features, functions, or structures disclosed in any other embodiment of this disclosure. The spacer 310 includes a spacer arm 330. A spacer body 320 is connected to the spacer arm 330. At least one saddle 340 is formed on the spacer body 320. At least one roller 350 is connected to at least one of the saddle 340 and the spacer body 320, wherein an exterior surface 352 of the roller 350 is positioned to intersect a cable interface path 360 of the at least one saddle 340.

As is shown in FIG. 8, the spacer 310 has a general construction that is similar to the spacer 210 depicted in FIG. 6. However, similar to FIGS. 2-5, the spacer 310 includes rollers 350 that are positioned within the saddle 340, such that they form the bottom of the saddle 340. As can be seen, the rollers 350 form the entire bottom of the saddle 340, whereas the rollers 150 of FIGS. 2-5 form a portion of the seat of the saddle 150. The rollers 350 may be removable from their position within the bottom of the saddle 340, however they are intended to be retained within the saddle 340 throughout the duration of the cable installation process, such that the cable moves through the saddle 340 by contacting the rollers 350. Thus, unlike the rollers 250 of FIGS. 6-7, the rollers 350 of FIG. 8 are not able to be moved or lowered from the cable interface path 360 without removing the rollers 350 completely from the saddle 340. The functioning of the rollers 350 and the movement of the cable, however, is the same as described with respect to FIGS. 2-7. Although not shown in FIG. 8, ratchet arms may be used to retain a cable within the cable interface path 360 and the saddle 340 once the cable reaches a desired position within the saddle 340.

Figure 9:
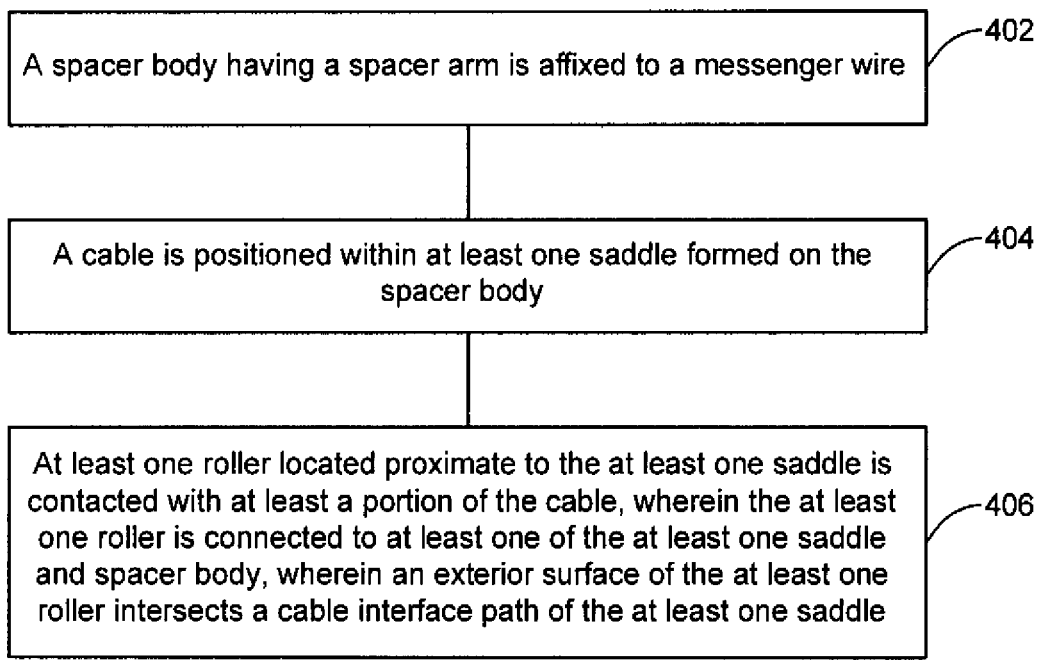
FIG. 9 is a flowchart illustrating a method of stringing and retaining a cable using and aerial cable spacer apparatus, in accordance with a fourth exemplary embodiment of the disclosure.

FIG. 9 is a flowchart 400 illustrating a method of stringing and retaining a cable using and aerial cable spacer apparatus, in accordance with a fourth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, a spacer body having a spacer arm is affixed to a messenger wire. A cable is positioned within at least one saddle formed on the spacer body (block 404). At least one roller is contacted with at least a portion of the cable, wherein the at least one roller is connected to at least one of the at least one saddle and the spacer body, wherein an exterior surface of the at least one roller intersects a cable interface path of the at least one saddle (block 406).

The method may include a number of additional steps and processes, including any of the steps, processes, or functions disclosed within this disclosure. For example, the cable may be retained within the saddle with a ratchet arm, wherein the ratchet arm is closable on the saddle and engageable with a plurality of ratchet teeth positioned on the saddle. The roller may be moved between at least a first positioned substantially in alignment with the cable interface path of the saddle and a second position wherein the roller is positioned below a cable interface surface of the saddle. The roller may be rotated on an axle positioned within the saddle. The roller may be a separable roller having at least two roller segments, wherein the at least two roller segments are connectable together and secured on the axle.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An aerial cable spacer apparatus comprising:
   a spacer arm;
   a spacer body connected to the spacer arm;
   at least one saddle formed on the spacer body, the at least one saddle including a pocket; and
   at least one roller connected to the at least one saddle, wherein the at least one roller is housed within the pocket, wherein the at least one pocket includes clearance to allow rotation of the at least one roller and wherein an exterior surface of the at least one roller is positioned to intersect a cable interface path of the at least one saddle.

2. The aerial cable spacer apparatus of claim 1, further comprising a ratchet arm closable on the at least one saddle to secure a cable within the at least one saddle, wherein the ratchet arm engages with a plurality of ratchet teeth positioned on the at least one saddle.

3. The aerial cable spacer apparatus of claim 1, wherein the exterior surface of the at least one roller forms a contact surface of the at least one saddle.

4. The aerial cable spacer apparatus of claim 1, wherein the at least one roller is movable between a first position substantially in alignment with the cable interface path of the at least one saddle and a second position wherein the at least one roller is positioned below a cable interface surface of the at least one saddle.

5. The aerial cable spacer apparatus of claim 4, wherein the at least one roller is positioned on a pivotal arm having at pivot point positioned within the at least one saddle.

6. The aerial cable spacer apparatus of claim 5, wherein the pivotal arm further comprises a ratchet arm, the ratchet arm closable on the at least one saddle to secure a cable within the at least one saddle, wherein the ratchet arm engages with a plurality of ratchet teeth positioned on the at least one saddle.

7. The aerial cable spacer apparatus of claim 1, wherein the at least one roller is formed within the at least one saddle.

8. The aerial cable spacer apparatus of claim 1, further comprising an axle positioned within the at least one saddle, wherein the at least one roller is rotatable about the axle.

9. The aerial cable spacer apparatus of claim 8, wherein the at least one roller further comprises a separable roller having at least two roller segments, wherein the at least two roller segments are connectable together about the axle to form the separable roller.

10. The aerial cable spacer apparatus of claim 9, wherein each of the at least two roller segments have a connector and a receiving structure, wherein the connector of a first of the at least two roller segments is engagable with the receiving structure of a second of the at least two roller segments.

11. The aerial cable spacer apparatus of claim 10, wherein each of the at least two roller segments is identical to each other.

12. An aerial cable spacer apparatus comprising:
    a spacer body;
    a spacer arm extending from the spacer body;

a plurality of saddles formed on the spacer body and extending from the spacer body, each saddle of the plurality of saddles having a pocket; and at least one roller positioned within the pocket of each of the plurality of saddles, wherein the at least one roller is rotatable on an axle secured to each of the plurality of saddles, wherein an exterior surface of the at least one roller substantially aligns with a cable contact surface of each of the plurality of saddles and each of the pockets includes clearance to allow rotation of each roller of the at least one roller.

13. The aerial cable spacer apparatus of claim 12, wherein the at least one roller further comprises a separable roller having at least two roller segments, wherein the at least two roller segments are connectable together about the axle to form the separable roller.

14. The aerial cable spacer apparatus of claim 13, wherein each of the at least two roller segments have a connector and a receiving structure, wherein the connector of a first of the at least two roller segments is engagable with the receiving structure of a second of the at least two roller segments.

15. The aerial cable spacer apparatus of claim 14, wherein each of the at least two roller segments is identical to each other.

16. A method of stringing and retaining a cable using and aerial cable spacer apparatus, the method comprising the steps of:

affixing a spacer body having a spacer arm to a messenger wire;

positioning a cable within at least one saddle formed on the spacer body, the at least one saddle having a pocket; and contacting at least one roller with at least a portion of the cable, wherein the at least one roller is connected to the at least one saddle, wherein the pocket of the at least one saddle includes clearance to allow rotation of the at least one roller wherein an exterior surface of the at least one roller intersects a cable interface path of the at least one saddle.

17. The method of claim 16, further comprising the step of retaining the cable within the at least one saddle with a ratchet arm, wherein the ratchet arm is closable on the at least one saddle and engageable with a plurality of ratchet teeth positioned on the at least one saddle.

18. The method of claim 16, further comprising the step of moving the at least one roller between at least a first position substantially in alignment with the cable interface path of the at least one saddle and a second position wherein the at least one roller is positioned below a cable interface surface of the at least one saddle.

19. The method of claim 16, further comprising the step of rotating the at least one roller on an axle positioned within the at least one saddle.

20. The method of claim 19, further comprising the step of securing the at least one roller on the axle, wherein the roller further comprises a separable roller having at least two roller segments, wherein the at least two roller segments are connectable together about the axle to form the separable roller.

* * * * *